United States Patent [19]

Ishikawa

[11] 4,023,543
[45] May 17, 1977

[54] INTERNAL COMBUSTION ENGINE
[75] Inventor: Yoshikazu Ishikawa, Chofu, Japan
[73] Assignee: Nissan Motor Co., Ltd., Yokohama, Japan
[22] Filed: Aug. 7, 1975
[21] Appl. No.: 602,892
[30] Foreign Application Priority Data
  Aug. 9, 1974  Japan .................. 49-91243
[52] U.S. Cl. .................. 123/75 B; 123/32 SP; 123/90.22; 123/188 S
[51] Int. Cl.² ................... F02M 19/10
[58] Field of Search .......... 123/32 ST, 32 SP, 75 B, 123/188 S, 90.22, 90.4, 191 S, 191 SP

[56] References Cited
UNITED STATES PATENTS

| | | | |
|---|---|---|---|
| 1,415,374 | 5/1922 | Lovejoy | 123/188 S |
| 1,716,890 | 6/1929 | Hofmann | 123/188 S |
| 3,304,922 | 2/1967 | Higeg | 123/75 B |
| 3,499,427 | 3/1970 | August | 123/75 B |
| 3,543,736 | 12/1970 | Suzuki et al. | 123/32 ST |
| 3,830,205 | 8/1974 | Date et al. | 123/32 ST |
| 3,871,351 | 3/1975 | Geiger et al. | 123/32 SP |

*Primary Examiner*—C. J. Husar
*Assistant Examiner*—David D. Reynolds

[57] ABSTRACT

An engine with a main combustion chamber, an auxiliary combustion chamber and a torch-nozzle interconnecting the main and auxiliary combustion chambers, comprises an auxiliary inlet valve that is operated by a rocker arm for operating a main inlet valve and a cylindrical wall positioned downstream of the valve seat of the auxiliary inlet valve to prevent an auxiliary induction passageway from being opened until the valve head of the auxiliary inlet valve has been lifted beyond a predetermined point.

1 Claim, 5 Drawing Figures

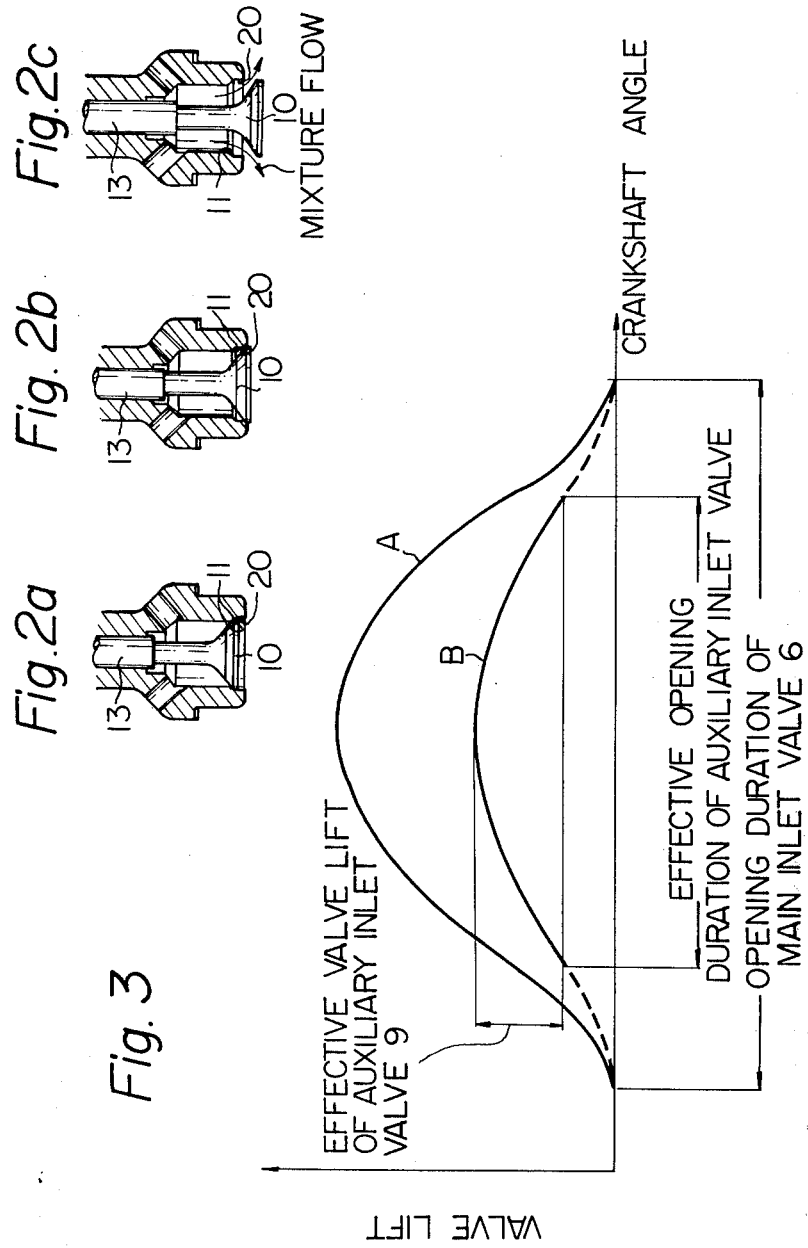

INTERNAL COMBUSTION ENGINE

The present invention relates generally to an internal combustion engine of the type comprising a main combustion chamber, an auxiliary combustion chamber, a torch nozzle interconnecting the main and auxiliary combustion chambers, a main induction passageway selectively openable to the main combustion chamber through a main inlet valve and an auxiliary induction passageway selectively openable to the auxiliary combustion chamber. More particularly the invention relates to a valve operating mechanism for a main and an auxiliary inlet valve of an engine of the above character.

To operate the engine of the above character in a stable manner it is necessary that the ratio between the quantity of air fed to the main combustion chamber and that of air fed to the auxiliary combustion chamber be maintained within a range so that ignition of the charge within the auxiliary combustion chamber and the stable combustion of the charge within the main combustion chamber may be assured. Thus the volume of the auxiliary combustion chamber should be so determined as to satisfy a certain relationship with the total clearance volume of the engine at the TDC position and the valve opening duration of the auxiliary inlet valve should be shorter than that of the main inlet valve.

To provide two different valve opening durations one conventional engine of the above character has, in addition to a rocker arm for operating a main inlet valve, a second rocker arm for operating an auxiliary inlet valve. The rocker arms are mounted in a space available above the cylinder head thus leading to complicated construction and arrangement. Since the space available above the cylinder head is limited, there is the accommodation difficulty of the two rocker arms and their associated parts and in the case that the main and auxiliary inlet valves are of a push rod type the installation of a coolant system becomes difficult.

The present invention therefore aims at simplifying the construction and arrangement for operating a main and an auxiliary inlet valve of an internal combustion engine of the above character It rocker arm an object of the present invention to provide an internal combustion engine of the above character in which an auxiliary inlet valve is operated by a rockerarm for operating a main inlet valve.

In accordance with the present invention, there is provided an internal combustion engine of the type comprising a main combustion chamber, an auxiliary combustion chamber, a torch nozzle interconnecting the main and auxiliary combustion chambers, a main induction passageway extending to the main combustion chamber, an auxiliary induction passageway extending to the auxiliary combustion chamber, a main inlet valve through which the main induction passageway is selectively openable, and a valve operating mechanism including a rocker arm to operate the main inlet valve, the combination with the rocker arm of: an auxiliary inlet valve through which the auxiliary induction passageway is selectively openable, the auxiliary inlet valve having a valve seat and a valve head engageable with the valve seat, the auxiliary inlet valve being operated by the rocker arm such that the valve head lifts from the valve seat, and a cylindrical wall extending from the valve seat downstream thereof, the cylindrical wall being engageable with the valve head of the auxiliary inlet valve to prevent the auxiliary induction passageway from being opened until the valve head has been lifted a predetermined point.

The above and other objects, features and advantages of the present invention will readily be apparent from the following description and the accompanying drawings, in which:

FIGS. 2a, 2b and 2c are views showing positions of parts of an auxiliary inlet valve structure of the internal combustion engine of FIG. 1; and FIG. 3 shows respective valve lift diagrams of a main inlet valve and an auxiliary inlet valve.

Figure 1:
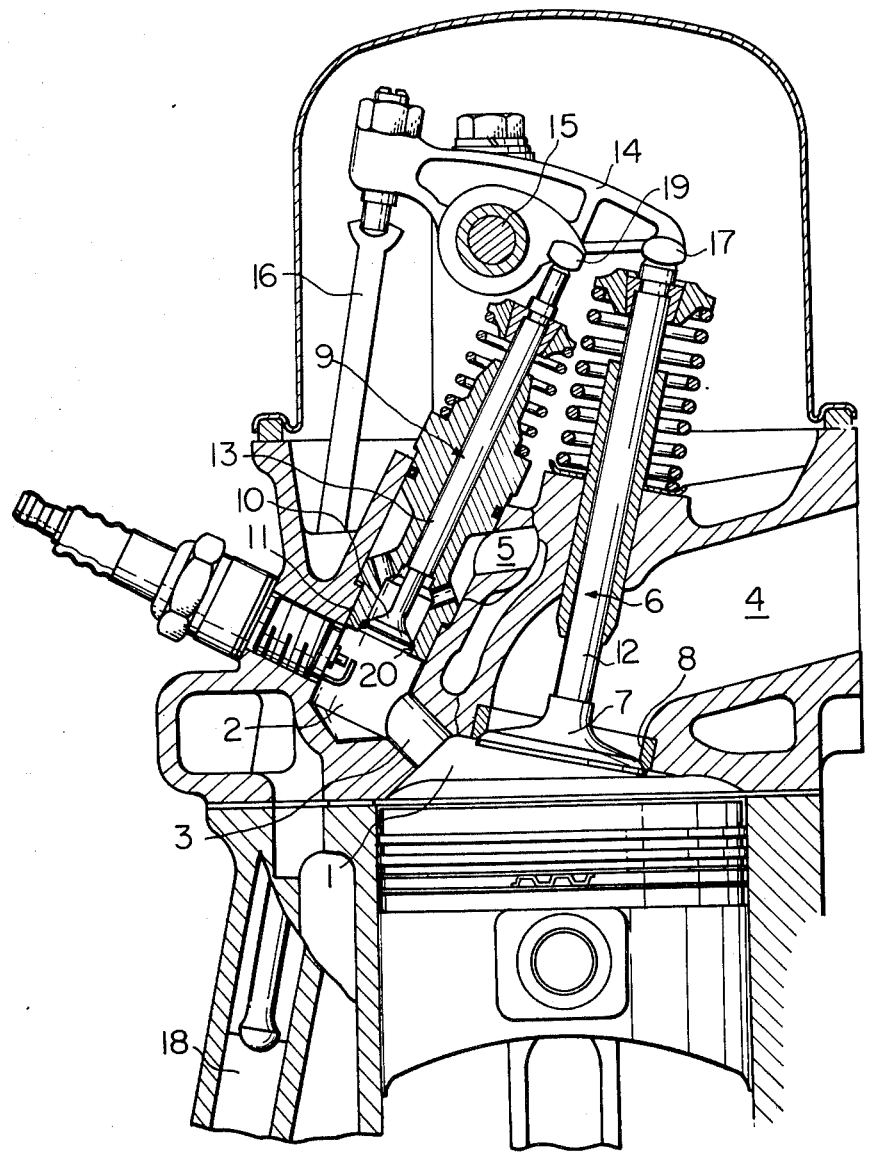
FIG. 1 is a section view of an internal combustion engine constructed in accordance with the present invention.

Referring to the accompanying drawings and particularly to FIG. 1, there is shown a portion of an internal combustion engine constructed in accordance with the present invention. The engine comprises a main combustion chamber 1, an auxiliary combustion chamber 2, a torch nozzle 3 interconnecting the main and auxiliary combustion chambers 1 and 2, a main induction passageway 4 extending to the main combustion chamber 1 and an auxiliary induction passageway 5 extending to the auxiliary combustion chamber 2. A main inlet valve 6 of a push rod type has a valve head 7 engageable with a valve seat 8 positioned in the main induction passageway 4 and an auxiliary inlet valve 9 also of a push rod type has a valve head 10 engageable with a valve seat 11 positioned in the auxiliary induction passageway 5. Designated by the reference numerals 12 and 13 are valve stems of the main and auxiliary inlet valves 6 and 9, respectively.

The main inlet valve 6 is operated in a conventional manner by a rocker arm 14 that is rockably mounted on a rocker arm shaft 15. The rocker arm 14 is operatively connected with a push rod 16 and includes a first tappet 17 in abutting engagement with the valve stem 12 of the main inlet valve 6. The push rod 16 has a cam follower 18 cooperating with a valve actuating cam (not shown) such that the main inlet valve 6 is lifted from the valve seat 8 according to a valve lift diagram A shown in FIG. 3. The rocker arm 14 also includes a second tappet 19 disposed at a location spaced on the same side as the first tappet 17 from the rocker arm shaft 15. The second tappet 12 is disposed nearer to the rocker arm shaft than the first tappet. The valve stem 13 of the auxiliary inlet valve 9 is in abutting engagement with the second tappet 19 and operated thereby such that the auxiliary inlet valve 9 is lifted from the valve seat 11 according to a valve lift diagram B shown in FIG. 3. It will be noted from the comparison of the valve lift diagram B with the valve lift diagram A that the valve opening timing and closing timing of the auxiliary inlet valve 9 coincide with those of the main inlet valve 6.

To reduce the valve opening duration of the auxiliary inlet valve, a cylindrical wall 20 is provided to prevent the valve from opening to the auxiliary combustion chamber 2 during an initial portion and a final portion of the valve opening duration.

The cylindrical wall 20 defines a bore having substantially the same diameter as that of the valve head of the auxiliary inlet valve 9. The cylindrical wall 20 extends from the valve seat 11 downstream of the valve seat, with respect to the intake mixture flow through the valve. The cylindrical wall 20 is engageable with the valve head to keep the auxiliary induction passageway 5 closed to the auxiliary combustion chamber 2 until the valve head 10 is lifted beyond a predetermined point.

In the internal combustion engine constructed in accordance with the present invention, with the cylindrical wall 20 effective valve lift valve opening and closing timing and valve opening duration of auxiliary inlet valve 9 are reduced as compared to those of the main inlet valve 6 and thus appropriate valve opening duration and timing of the auxiliary inlet valve 9 with the valve operating rocker arm 14 for operating the main inlet valve 6 is achieved.

What is claimed is:

1. An internal combustion engine comprising a main combustion chamber; an auxiliary combustion chamber; a torch nozzle interconnecting the main and auxiliary combustion chambers; a main induction passageway extending to the main combustion chamber; an auxiliary induction passageway extending to the auxiliary combustion chamber; a main inlet valve through which the main induction passageway is selectively openable; an auxiliary inlet valve through which the auxiliary induction passageway is selectively openable; a valve operating mechanism including a rocker arm to operate the main inlet valve; the auxiliary inlet valve having a valve seat and a valve head engageable with the valve seat, the auxiliary inlet valve being operated by the rocker arm such that the valve head lifts from the valve seat; and a cylindrical wall extending from the valve seat downstream thereof, the cylindrical wall being engageable with the valve head of the auxiliary inlet valve to prevent the auxiliary induction passageway from being open until the valve head has been lifted by a predetermined amount, whereby the main inlet valve opens and closes the main induction passageway before and after, respectively, the auxiliary inlet valve opens and closes the auxiliary induction passageway.

* * * * *